Patented Jan. 31, 1939

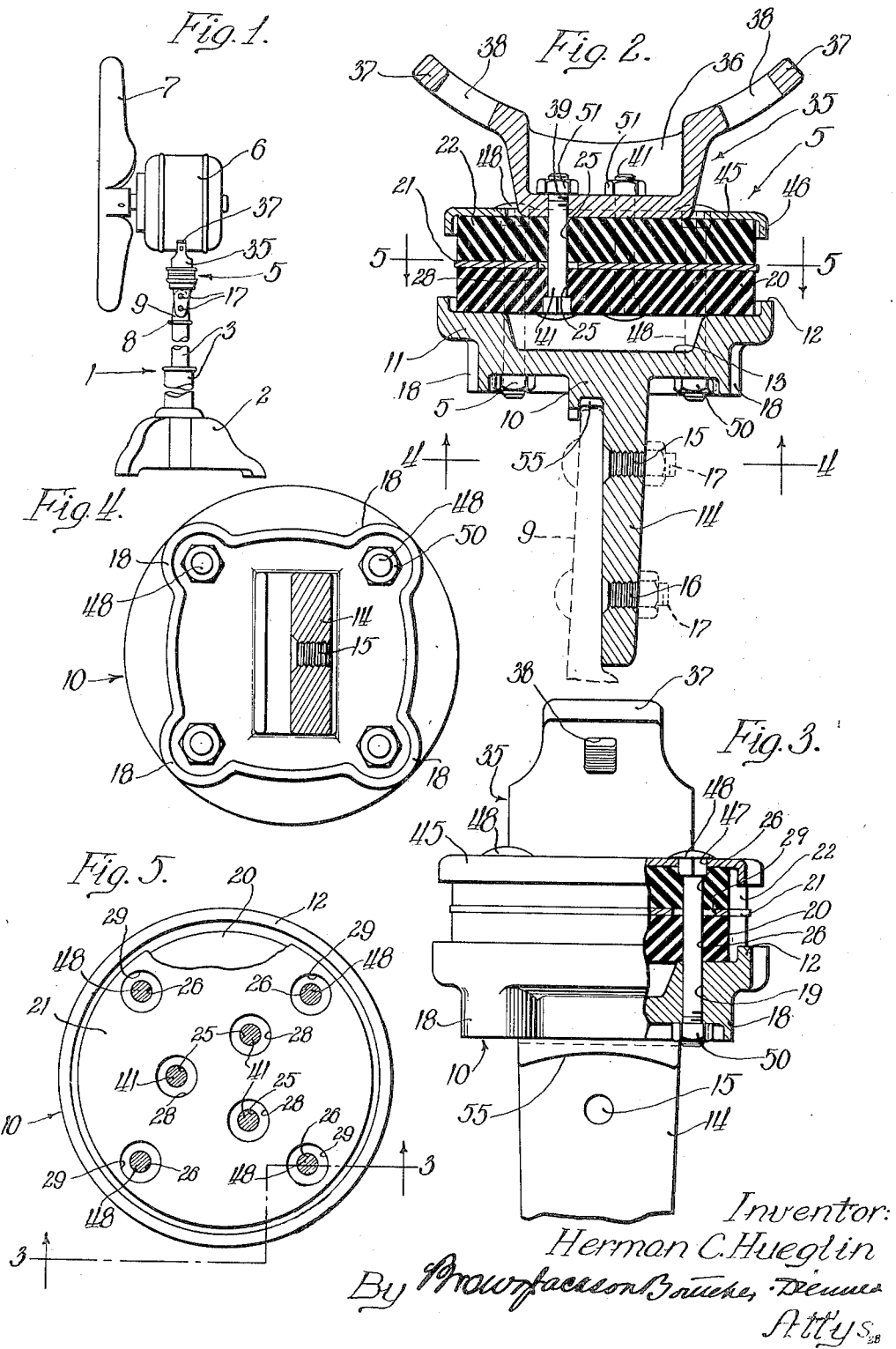

2,145,655

UNITED STATES PATENT OFFICE 2,145,655

RESILIENT MOUNTING FOR A MOTOR OR THE LIKE

Herman C. Hueglin, Chicago, Ill., assignor to Airmaster Corporation, Chicago, Ill., a corporation of Illinois Application February 18, 1938, Serial No. 191,172

3 Claims. (Cl. 248—13)

This invention relates to mountings for such devices as fan motors and the like and has for its principal object the provision of a resilient mounting for a motor or the like in which a cushioned and vibration-absorbing support is provided but in which the yielding of the resilient parts is restricted so as to prevent undesired oscillations or other movements of the motor or other device so supported.

A further object of this invention is to provide a simple and inexpensive resilient mounting which can be easily fabricated and assembled.

These and other objects and advantages of the present invention will be apparent to those skilled in the art after a consideration of the following detailed description, taken in conjunction with the accompanying drawing illustrating the preferred embodiment.

In the drawing:

Figure 1 is an elevation of a stand-mounted circulating fan embodying the principles of the present invention;

Figure 2 is an enlarged section taken through the resilient mounting employed in the fan support shown in Figure 1;

Figure 3 is a view taken along the line 3—3 of Figure 5;

Figure 4 is a section taken along the line 4—4 of Figure 2; and

Figure 5 is a section taken along the line 5—5 of Figure 2.

Referring now more particularly to Figure 1, the present invention is shown as embodied in an air circulating fan that includes stand 1 having a base 2 carrying one or more tubular sections 3. The resilient mounting means, indicated in its entirety by the reference numeral 5, that constitutes the present invention is carried at the upper end of the upper standard section 3. The mounting means 5 supports the motor 6 driving the fan in the usual manner. The stand 1 has a bracket 8 with an upstanding lug 9 to receive the mounting unit 5.

The resilient mounting unit 5 comprises a lower bracket or base 10 having a radially extending section 11 formed with an upwardly directed flange 12. The bracket 10 includes a centrally disposed generally circular recess 13 and has a depending lug 14 with tapped openings 15 and 16 therein to receive the bolts 17 or other means by which the mounting unit 5 may be fastened to the bracket 8 or other supporting structure. The base section 10 is provided with four bosses 18 which are apertured to provide bolt-receiving holes 19 (Figure 3).

The upper surface of the base 10 surrounding the recess 13 is flat and is adapted to receive a resilient disk 20. A flat metal disk 21 is disposed above the disk 20, and above the metal disk 21 is another resilient disk 22. Preferably the disks 20 and 22 are formed of rubber or rubber-like material so as to serve as the cushioning elements of the unit 5. Each of the resilient disks 20 and 22 is provided with a central set of three openings 25 and a peripheral set of four openings 26, as best shown in Figures 2 and 3, respectively. The sheet metal disk 21 is provided with a set of three holes 28 in the central portion thereof and a set of four holes 29 in the peripheral portion, arranged, as best shown in Figure 4, in a manner to register with the holes 25 and 26 in the resilient disks 20 and 22. Figure 4 also shows a relation of each set of holes to the other set, and it will also be noted that the openings in the metal disk 21 are appreciably larger than the corresponding openings in the resilient disks 20 and 22. Clamping bolts are disposed in these openings as will be described below.

Mounted on the disks 20, 21 and 22 is a fixture receiving bracket 35 having a central socket or cup-shaped portion 36 and a pair of outwardly and upwardly curved attaching ears 37 which are apertured, as at 38, to receive bolts or other means by which the motor 6 can be attached thereto. The central socket or recessed portion 36 of the fixture receiving bracket 35 is provided with three openings 39 arranged to register with the central openings in the disks 20, 21 and 22. Bolts 41 are extended upwardly through the disks 20, 21 and 22 so that their heads are embedded in the lower surface of the disk 20 and the threaded ends extend upwardly through the openings 39 in the socket 36 of the bracket 35. From Figure 2 it will be noted that there is appreciable clearance between the bolts 41 and the openings 28 in the metal disk 21 through which the bolts pass.

A clamping ring 45 having a peripheral flange 46 is disposed over the upper surface of the resilient disk 22 and is formed with four openings 47 to receive the heads of four bolts 48 which extend downwardly through the registering openings 26 and 27, and through the openings 19 in the base bosses 18, as best indicated in Figure 3. Nuts 50 are screwed onto the threaded lower ends of the bolts 48, and nuts 51 are screwed onto the upper threaded ends of the central bolts 41.

In assembling the resilient mounting unit 5, the disks 20, 21 and 22 are brought together in the proper relation with the metal disk 21 between the resilient disks and with the clamping ring 45 in place, and then the central bolts 41 are inserted through the corresponding openings in the disks and through the openings 39 in the socket 36, and then the nuts 51 are screwed onto the bolts and tightened so that the fixture receiving bracket 35 is fastened firmly to the assembled disks. Care is taken to see that the metal disk 21 is not in contact with any of the bolts 41. It will be observed that the diameter of the metal disk 21 is substantially the same as the diameter of the resilient disks 20 and 22, which aids in keeping the disks in proper relation while tightening the bolts 41. Next the assembled bracket 35 and disks are placed on the base 10 with the heads of the bolts 41 disposed in the recess 13, and then the bolts 48 are passed downwardly through the registering openings in the clamping ring 45 and the disks 20, 21 and 22, and downwardly through the openings 19 in the base 10. Then the nuts 50 are threaded onto the bolts 48 and tightened, whereupon the entire unit is fastened together. The unit is mounted on the stand 1 by inserting the bolts 17 through the apertures in the lug 9 and the openings 15 and 16 in the lug 14, and then tightening the bolts to hold the parts together in the position shown in Figure 3. The base 10 has a recess 55 (Figure 2) to receive the upper edge of the lug 9.

It will be noted that, in effect, the fixture receiving bracket 35 is bolted to the resilient members at one point while at other points the resilient members are bolted to the base or bracket receiving them so that there is no metal-to-metal contact between the brackets or the bolts associated therewith. This construction provides the desired cushioning effect for the motor 6, but the amount that the resilient members 20 and 22 can yield is limited by the intermediate metal disk 21. This prevents undesirable oscillations or other movements of the motor 6 when in operation but does not interfere with the action of the resilient disks 20 and 22 in cushioning the vibrations which otherwise would be transmitted from the motor 6 to the supporting pedestal.

While I have shown and described above the preferred structure in which the principles of the present invention have been embodied, it is to be understood that my invention is not to be limited to the specific details shown and described above, but that, in fact, widely different means may be employed in the practice of the broader aspects of my invention.

What I claim, therefore, and desire to secure by Letters Patent is:

1. A resilient mounting for a motor or the like comprising a flanged base having a central recess therein, a fixture receiving bracket also having a central recess, a block of resilient material adapted to be interposed between said base and bracket, bolt means passing through the central portion of said resilient block and into the recess in said fixture receiving bracket for fastening the latter to said block, and means passing through the peripheral portion of said block and the flanged portion of said base for clamping the block to the base with the portions of said bolt means on the side of said block opposite the fixture receiving bracket disposed in the central recess in said base, whereby there is no metal-to-metal contact between said base and bracket.

2. A resilient mounting for a motor or the like comprising a bracket having a base section with a central recess therein, a fixture receiving bracket, a pair of disks formed of resilient material, a metal disk adapted to be disposed between said resilient disks, bolt-receiving openings in the central portions of said disks and in the peripheral portions thereof, the openings in said central disk being larger than the openings in said resilient disks, bolt means passing through the central openings in said disks for clamping the resilient disks with the metal disk therebetween to said fixture receiving bracket, and bolt means extending through the peripheral openings in said disks for securing the disks to the peripheral portion of said base section with the exposed portions of said first bolt means opposite the fixture receiving bracket disposed in said central recess, all of said bolt means being out of contact with the metal disk and the latter serving to limit the yielding of said resilient disks.

3. A resilient mounting for a motor or the like, comprising a base having a central recess therein, a fixture receiving bracket having a central socket, a pair of disks formed of resilient material and having a central set of bolt receiving openings and a series of perpiherally spaced bolt receiving openings, a metal disk disposed between said resilient disks and having bolt receiving openings therein corresponding to but larger in diameter than the openings in said pair of resilient disks, a plurality of bolts extending upwardly through said disks for clamping them to said fixture receiving bracket, a portion at one end of each of said bolts extending into the socket of said fixture receiving bracket and a portion of each bolt at the other end projecting outwardly of the associated resilient disk, a clamping ring disposed about and out of contact with said fixture receiving bracket, and bolt means passing through the peripheral openings in said disks and through openings in said clamping ring and said base for clamping said disks on the attached fixture receiving bracket to the base with no metal-to-metal connection between said base and bracket.

HERMAN C. HUEGLIN.